United States Patent

Kaltz

Patent Number: 5,118,130
Date of Patent: Jun. 2, 1992

[54] COLLAPSIBLE HAND TRUCK

[76] Inventor: Bernard S. Kaltz, 125 E.N. "D" St., Gas City, Ind. 46933

[21] Appl. No.: 594,593

[22] Filed: Oct. 9, 1990

[51] Int. Cl.⁵ .............................................. B62B 1/12
[52] U.S. Cl. ................................ 280/154; 280/47.29; 211/195
[58] Field of Search ............ 280/651, 652, 654, 47.17, 280/47.18, 47.19, 47.24, 47.27, 47.29, 63, 79.11; 248/129, 453; 211/85, 132, 195

[56] References Cited

U.S. PATENT DOCUMENTS

| | | | |
|---|---|---|---|
| 1,432,037 | 10/1922 | Russell | 280/47.19 |
| 3,194,576 | 7/1965 | Kankle | 280/654 |
| 3,947,054 | 3/1976 | Hall | 280/36 |
| 4,185,853 | 1/1980 | Thurmond, Jr. | 280/652 |
| 4,205,937 | 6/1980 | Fawley | 414/457 |
| 4,448,434 | 5/1984 | Anderson | 280/40 |
| 4,625,949 | 12/1986 | Walker | 266/48 |
| 4,784,405 | 11/1988 | Stein | 280/47.29 |
| 4,865,346 | 9/1989 | Carlile | 280/47.29 |

OTHER PUBLICATIONS

Pepco Co. Brochure.

Primary Examiner—Andres Kashikow
Assistant Examiner—Richard Camby
Attorney, Agent, or Firm—Krass & Young

[57] ABSTRACT

A hand truck which may be collapsed by operation of a pivotable support plate and pivotable load bearing side brace members which may be readily detached from the support plate. The hand truck includes a substantially rectangular frame having an upper handle portion, two parallel side portions, and a lower portion. A pair of wheels are rotatably secured in opposed axial alignment on opposite sides of the lower portion of the frame. A support plate pivotably attaches to the lower portion of the frame so that the support plate may pivot about a substantially horizontal axis between a lower horizontally disposed operative position and an upper vertically disposed storage position. A pair of side brace members have lower portions adapted to removably engage the support plate proximate a respective side edge of the support plate and upper portions adapted to pivotably engage a respective parallel side portion of the frame so that each brace member may pivot about a substantially vertical axis between an operative position substantially perpendicular to the frame and a storage position against and substantially parallel to the frame.

17 Claims, 3 Drawing Sheets

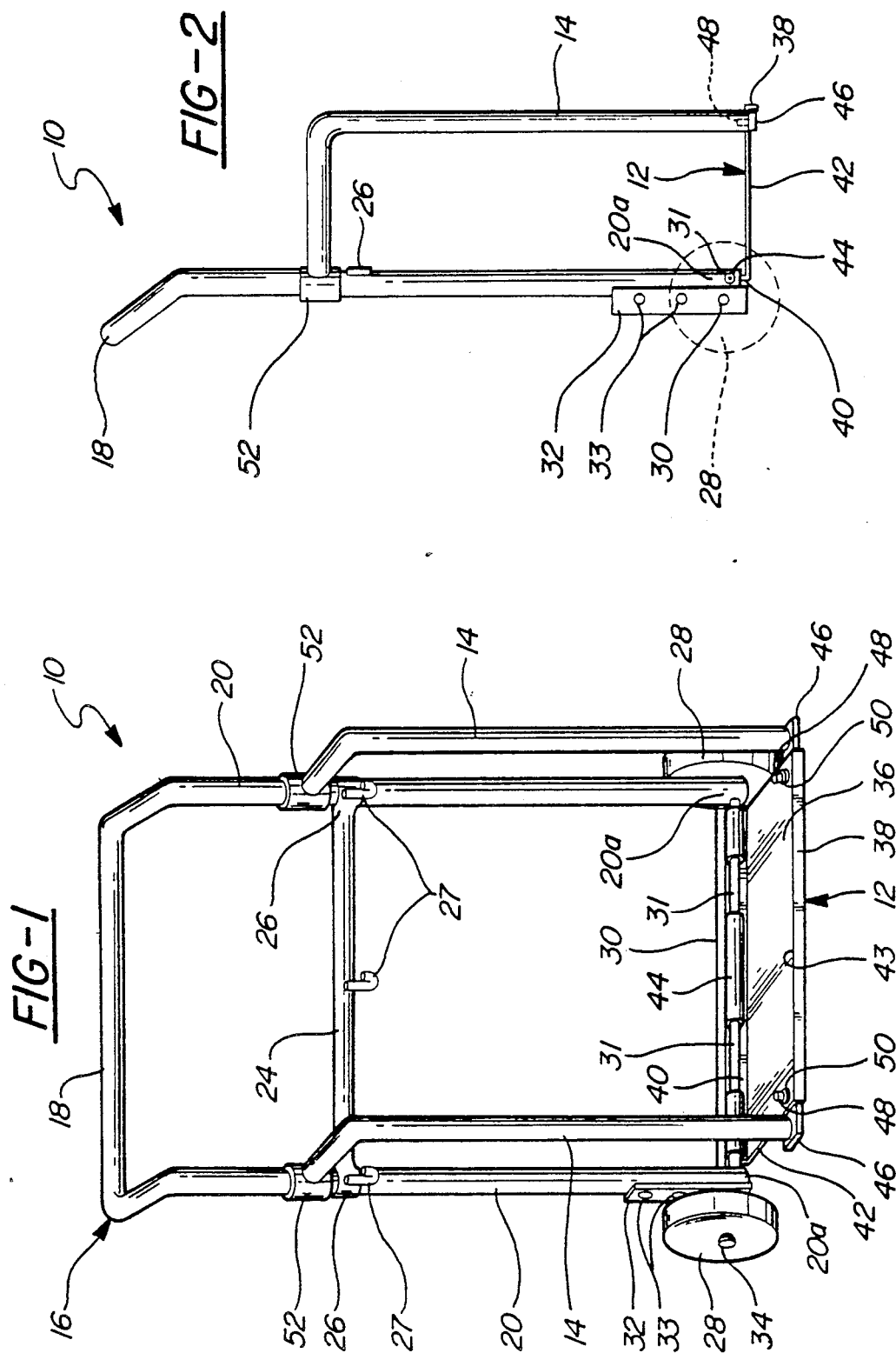

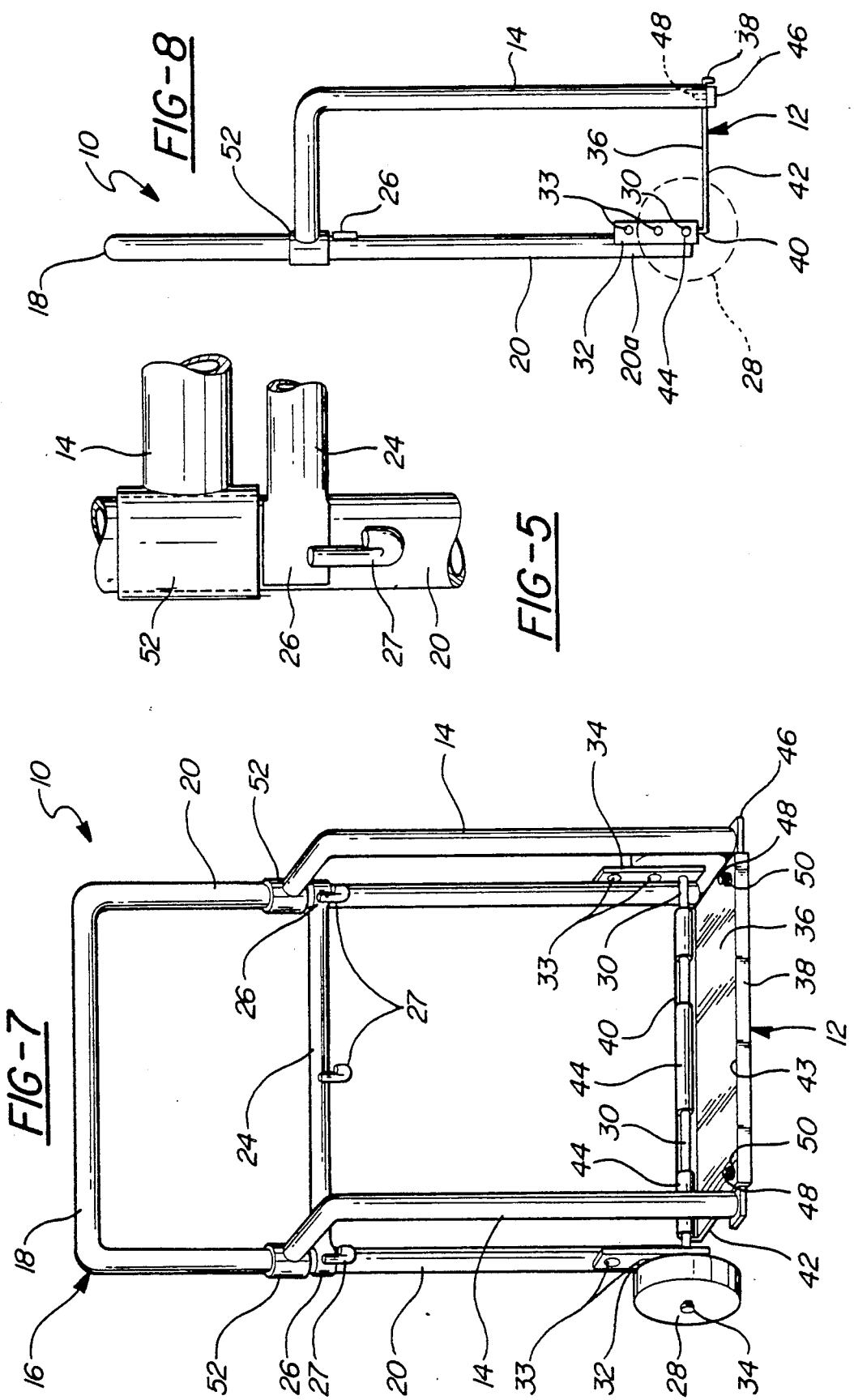

COLLAPSIBLE HAND TRUCK

FIELD OF THE INVENTION

The present invention relates to hand trucks and more specifically to collapsible hand trucks designed to transport welding gas cylinders.

BACKGROUND OF THE INVENTION

Hand trucks provide a convenient two-wheeled apparatus which is capable of engaging, supporting, and transporting an object. Typically, a support plate extends at a right angle forward from the body of the hand truck in close proximity to the ground. The object is lifted by positioning the object on the support plate and rotating the hand truck backward about the wheel axis, causing the object to rest on both the support plate and the body of the hand truck. The object may then be moved by rolling the hand truck on its wheels. Thus, hand trucks provide a simple mechanism for moving large, or otherwise cumbersome, objects.

As an example, welding equipment is both large and cumbersome to transport. Oxygen and fuel storage cylinders are difficult to handle by themselves. Hand trucks have been designed to store and transport these gas cylinders to facilitate the use of the welding equipment. Typically, the cylinders are placed on the forwardly extending support plate and secured against the body of the hand truck by straps, chains, or similar retainers. The individual cylinders are thus grouped as a unit and adapted to be readily transported about an area where the welding equipment is to be utilized.

The forwardly extending support plate creates problems associated with storing and transporting the hand truck. Typically, the support plates are welded or otherwise rigidly secured to the body of the hand truck. Side brace members, extending from the body of the truck to the sides of the support plate, may additionally be utilized to provide support to the support plate. When these rigid hand trucks, with or without side brace members, are stored in a box for shipment, a significant amount of space therein is wasted to accommodate the outwardly extending support plate. Correspondingly, valuable space on a cargo carrier is also wasted.

Support plates which are bolted to the body of the hand truck have been used to address the problems associated with fixed support plates, but have created additional problems. When this type of hand truck is shipped with the support plate unattached to the hand truck, a merchant or purchaser must thereafter bolt or otherwise secure the support plate to the body of the hand truck. The required assembly of the parts is tedious, the hand truck may be improperly assembled, and further the loose parts may be lost in shipping.

Pivotable support plates have also been used to address the problems associated with fixed support plates, but have created additional problems, as well. Specifically, the support plate may break off under the significant downward forces associated with transporting heavy objects, if not supported adequately.

The prior art has addressed the problems associated with pivotable support plates by either providing substantial connector and stop plate arrangements to withstand the load forces or providing folding side braces which are connected at opposite ends to the support plate and the boy do the hand truck and adapted to fold about a central pivot point when the support plate is pivoted. Both of these prior art structures are relatively costly to manufacture and require a plurality of parts which must be assembled and maintained.

SUMMARY OF THE INVENTION

The hand truck of the present invention provides the advantages of a pivotable support plate in a simple and inexpensive hand truck construction.

The hand truck of the invention is of the type including an upright frame and a support plate mounted proximate the lower end of the frame for movement between an operative position extending generally forwardly from the frame and a folded, storage position pivoted upwardly with respect to the frame. According to an important feature of the invention, the support plate is supported in its operative position by at least one side brace member mounted on the frame for pivotable movement about a generally vertical axis between an operative position in which it extends forwardly from the frame and releasably engages and supports the support plate in the operative position of the support plate and a folded, storage position in which it is disengaged from the support plate and pivoted to a position in which it is generally parallel to the frame. This arrangement provides the advantages of a pivotable support plate in a simple and inexpensive structure.

According to a further feature of the invention, the support plate includes a hole, and the lower end of the brace member includes an upwardly projecting pin adapted to engage the hole in the support plate when disposed in its operative position. The hole and pin arrangement allows the brace member to releasable engage the support plate in a simple and efficient manner.

According to a further feature of the invention, the hand truck includes a pair of brace members; the support plate includes a pair of holes, each of the holes being disposed proximate respective forward corners of the shelf portion as formed by the forward edge and respective side edges thereof; and the lower portion of each brace member includes an upwardly projecting pin adapted to engage a respective one of the holes in the support plate when disposed in the operative position. A brace member is thus positioned on each side of the support plate to reinforce the support plate.

According to a further feature of the invention, the hand truck includes wheels supported on an axle, and the support plate pivots on a central portion of the axle. The axle, functioning both to align the wheels and provide the pivot axis for the support plate, reduces the number of parts required to construct the present hand truck.

According to a further feature of the invention, the brace member is mounted for sliding movement on the frame in a direction generally parallel to the vertical axis. Thus, the brace member may slide upwardly along the frame when positioning the brace member in the storage position.

According to a further feature of the invention, the support plate includes a generally planar shelf portion and the pivot axis of the support plate is spaced from the plane of the shelf portion so that, when the brace member is slid upwardly on the frame, the support plate may be pivoted upwardly to provide a storage condition in which the brace member is located between the support plate and the frame. The brace member is, thus, relatively secured in its storage position.

According to a further feature of the invention, the frame includes a vertical rail, and the brace member includes a tubular section slidably mounted on the rail. The tubular section of the brace member receives the vertical rail therein, and allows for sliding movement of the brace member along the rail in a simple and efficient manner.

In the disclosed embodiment, the hand truck includes a pair of side brace members, each having a lower portion adapted to releasably engage the support plate proximate a respective side edge of the support plate; the frame further includes two parallel side rails; and the upper portion of each brace member pivotably engages a respective one of the parallel side rails of the frame. Each brace member may, thus, pivot inwardly about a substantially vertical axis between an operative position substantially perpendicular to the frame and a storage position substantially parallel to the frame.

Further, in the disclosed embodiment, the frame includes a cross brace member having opposed ends attached to respective parallel side rails of the frame. The cross brace member strengthens the frame and is positioned so as to form a stop bar on each of the parallel side rails to limit the downward movement of each brace member thereon, allowing the side brace members to reinforce the support plate.

BRIEF DESCRIPTION OF THE DRAWINGS

These and other objects and aspects of the invention will become apparent in the detailed description of the invention hereinafter with respect to the drawings in which:

FIG. 1 is a perspective view of the hand truck in an operative position;

FIG. 2 is a side view of the hand truck of FIG. 1;

FIGS. 4 and 5 are detailed views of the hand truck frame;

FIG. 7 is a perspective view of an alternative embodiment of the hand truck in an operative position; and FIG. 8 is a side view of the alternative embodiment of FIG. 7.

DETAILED DESCRIPTION OF THE PREFERRED EMBODIMENT

The present invention provides for an inexpensive hand truck 10, having a pivotable support plate 12 and related load bearing side brace members 14, which may be collapsed for storage and transportation. Further, the hand truck 10 is specifically designed to accommodate welding equipment.

Figure 3:
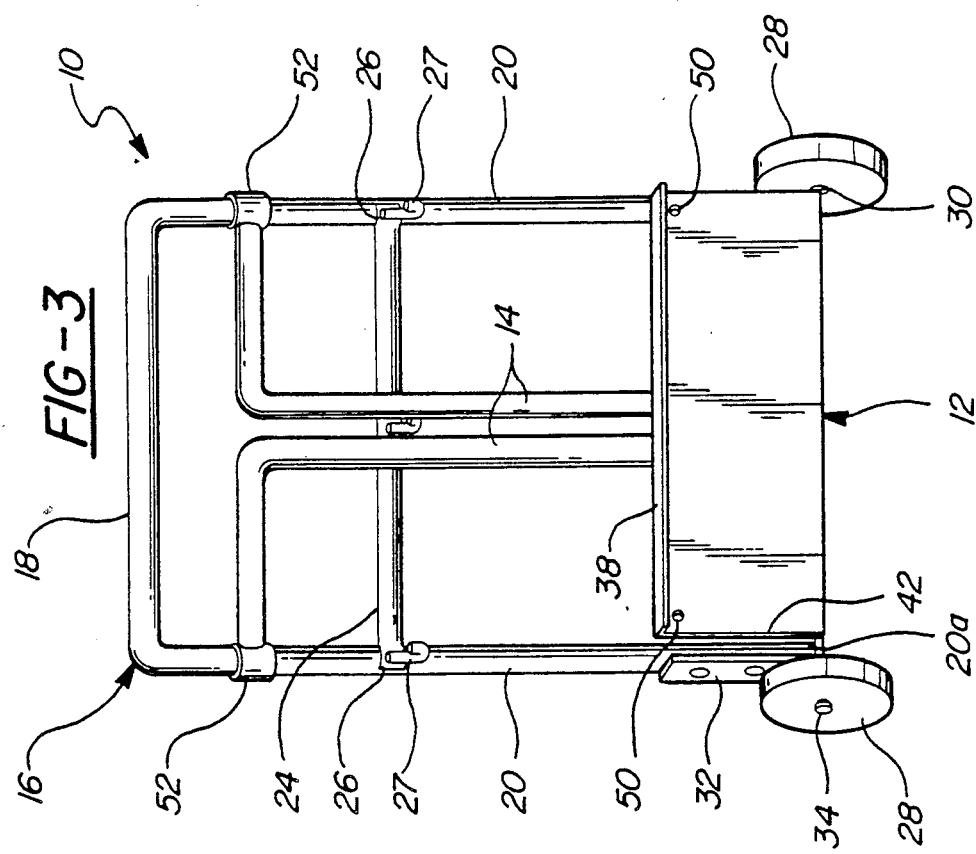
FIG. 3 is a perspective view of the hand truck in a storage position.

With reference to FIGS. 1 through 3, the hand truck 10 includes a substantially rectangular frame 16 having an upper handle portion 18 and two parallel side rails 20. The handle portion 18 projects away from the plane of the frame 16 to provide a handle portion 18 which is removed from the objects supported on the hand truck 10. The frame 16 is formed from one inch outside diameter steel tubing bent into an inverted U shape so that the bight of the U forms handle portion 18 and the legs of the U form the two parallel side rails 20 which terminate in lower end portions 20A. The frame further includes a cross brace member 24 formed from one inch, outside diameter, steel tubing. The cross brace member 24 has opposed flattened ends 26 welded to respective parallel side rails 20 of the frame 16, and operates to strengthen the frame 16. Three chain hooks 27 are welded at intervals along the cross brace member 24 to provide connection means for chains or straps (not shown) to secure upright gas cylinders to the hand truck 10 as is known in the industry.

A pair of wheels 28 are rotatably secured on an axle 30. Axle 30 is formed from suitable steel rod or tube and extends through axle supports 32. Axle supports 32 are welded to outboard faces of the lower portions 20A of the side rails 20 and position the axle 30 on a substantially horizontal axis to align the wheels 28 at opposite sides of the lower portion of the frame 16. Axle caps 34, cotter pins or the like, secure the wheels 28 to the axle 30. The axle supports 32 have a plurality of axle holes 33 arranged vertically on the axle support 32 to selectively position the axle 30 at various heights depending on the diameter of the wheels 28 so as to keep the support plate 12 in relative proximity to the ground. Various types of wheels 28 may be utilized depending on the weight to be carried by the hand truck 10 and the intended use of the hand truck 10 as is known in the industry.

Figure 6:
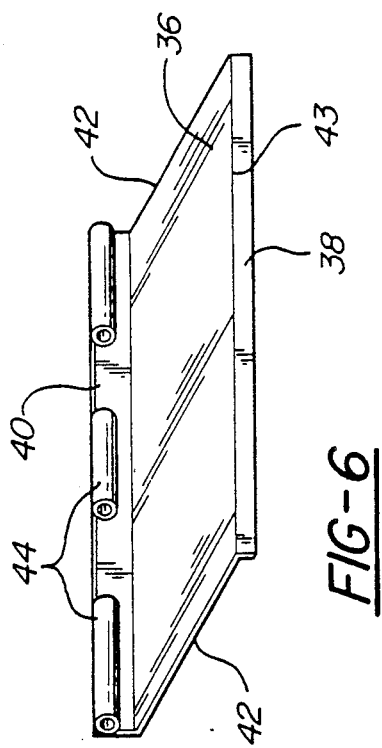
FIG. 6 is a perspective view of a support plate utilized in the hand truck.

With reference also to FIG. 6, the support plate 12 is formed of 12 gauge steel sheet metal and includes a substantially planar shelf portion 36, a forward downwardly extending flange portion 38, and a rearward upwardly extending flange portion 40. The shelf portion 36 defines opposed side edges 42, and forward edge 43 proximate forward flange portion 38. Several $\frac{3}{8}$ inch steel sleeves 44 are welded to the front face of the rearward flange 40. A pivot axle 31 extends through the sleeves 44 and is secured by axle caps, cotter pins or the like at opposite ends to lower end portions 20A so that the support plate 12 may engage a central portion of pivot axle 31 and pivot about the horizontal axis of the pivot axle 31 between a lower, horizontally disposed, operative position (as shown in FIG. 1) and an upper, vertically disposed, storage position (as shown in FIG. 3). The rearward flange portion 40 extends substantially perpendicular to the shelf portion 36 so that, when the support plate 12 is placed in the lower horizontally disposed operative position, the rearward flange portion 40 depends substantially downwardly from the frame 16 to position the shelf portion 36 below the pivot axle 31.

Figure 4:
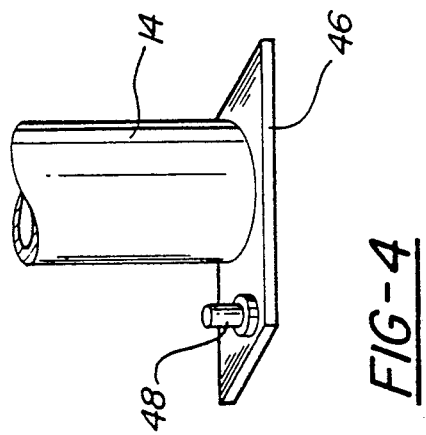

With reference also to FIG. 4, the pair of side brace members 14 are adapted to releasably engage the support plate 12 proximate a respective side edge 42 so as reinforce the support plate 12. The lower portion 22 of each brace member 14 includes a $\frac{1}{4}" \times 1\frac{1}{4}" \times 2\frac{1}{2}"$ steel foot member 46 welded to brace member 14. Each foot member 46 extends inwardly under the support plate 12 when placed in the operative position and includes a pin 48 projecting upwardly therefrom. The pin 48 is preferably a $\frac{3}{8}" \times \frac{1}{2}"$ steel bolt welded to foot member 46. A pair of support plate holes 50 are disposed proximate respective forward corners of the shelf portion 36 as formed by the forward edge 43 and respective side edges 42 of the shelf portion 36. Each upwardly projecting pin 48 engages a respective hole 50 in the support plate 12 by projecting upwardly therethrough to provide a releasable connection therebetween. The brace members 14 are thereby adapted to releasably engage the support plate 12 when it is disposed in the lower horizontally disposed operative position (as shown in FIG. 1).

With reference also to FIG. 5, the side brace members 14 further include upper portions 52 adapted to pivotably engage a respective parallel side rail 20 of the frame 16 so that each brace member 14 may pivot inwardly about a substantially vertical axis between an operative position substantially perpendicular to the frame 16 (as shown in FIG. 1) and a storage position against and substantially parallel to the frame 16 (as shown in FIG. 3). The upper portion 52 of each side brace member 14 is configured as a tubular slide section, comprising a 2 inch section of 1¼ inch, outside diameter, steel tubing adapted to receive the respective side rail 20 of the frame 16 therewithin so as to slidably engage a respective one of the parallel side rails 20 of the frame 16. As previously stated, the parallel side rails 20 of the frame 16 are formed of a tubular material, allowing the tubular upper portion 52 to slide upwardly along the respective side rail 20 to elevate the brace member 14 when placed in the storage position. Each brace member 14 is thereby positioned between the frame 16 and the support plate 12 when the apparatus is placed in the storage position, and enables the frame 16 and support plate 12 to bear upon opposite sides of the brace members 14 retaining them in the storage position. The cross brace member 24 operates as a stop bar on each of the parallel side rails 20 to limit the downward movement of the tubular upper portion 52, and allow the side brace members 14 to thereby reinforce the support plate 12.

With reference to FIGS. 7 and 8, an alternative embodiment of the present invention allows the axle 30 to operate as both the wheel axis and the pivot axis for the support plate 12. The axle 30 extends through the axle supports 32 and engages wheels 28 as previously described. Sleeves 44 engage a central portion of the axle 30 so that the axle 30 also operates as the pivot axis for the support plate.

In this alternative embodiment, the hand truck 10 is not as readily adaptable to a variety of wheel types as the previous embodiment. Movement of the axle 30 between various holes 33 in axle supports 32 to accommodate various wheels will change the pitch of the shelf portion 36 in support plate 12, since the sleeves 44 directly engage the axle 30. Therefore, in this embodiment either the hand truck 10 will not be adjustable over as wide a range of wheel diameters as the previous embodiment or separate and interchangeable support plates 12 having rearward upwardly extending flange portions 40 of various heights will be required to accommodate the changes in axle 30 height due to changes in wheel 28 diameter.

It can also be seen from this alternative embodiment that the handle portion 18 need not project away from the plane of the frame 16.

In summary, in the operative position of the hand truck 10, either embodiment provides a horizontally disposed shelf for transporting welding gas cylinders or other objects. The storage position of the hand truck 10 provides a collapsed structure wherein the side brace members 14 are positioned between the frame 16 and the support plate 2. The wheels 28 may be removed for shipment to further decrease the overall width of the hand truck 10. It will be seen that the present invention provides the advantages of a pivotable support plate in a simple and inexpensive hand truck construction.

The present embodiment utilizes components dimensioned for average size welding gas cylinders. If substantially larger or smaller cylinders are to be transported, the components may be scaled accordingly. From the foregoing description of the preferred embodiment it can be seen that various alternative embodiments of the invention can be anticipated without departure from the scope of the invention as defined in the following claims.

I now claim:

1. A hand truck including an upright frame and a support plate mounted proximate the lower end of the frame for movement between an operative position extending generally forwardly from the frame and a folded, storage position pivoted upwardly with respect to the frame, characterized in that the support plate includes at least one hole therein and is supported in its operative position by at least one side brace member having an upwardly projecting pin at its lower end adapted to be received in said at least one hole, said at least one side brace member being mounted on the frame for pivotable movement about a generally vertical axis between an operative position in which it extends forwardly from the frame and releasably engages and supports the support plate in the operative position of the support plate and a folded, storage position in which it is disengaged from the support plate and pivoted to a position in which it is generally parallel to the frame.

2. The apparatus of claim 1, wherein
said hand truck includes wheels supported on an axle; and
said support plate pivots on a central portion of said axle.

3. The apparatus of claim 1, wherein
said at least one side brace member is mounted for sliding movement on said frame in a direction generally parallel to said vertical axis.

4. The apparatus of claim 3, wherein
said support plate includes a generally planar shelf portion and the pivot axis of the support plate is spaced from the plane of said shelf portion so that said at least one side brace member may be slid upwardly on said frame, and said support plate may be pivoted upwardly to provide a storage condition in which said at least one side brace member is located between said support plate and said frame.

5. The apparatus of claim 3, wherein
said frame includes a vertical rail; and
said at least one side brace member includes a tubular section slidably mounted on said rail.

6. In a collapsible hand truck having a substantially rectangular frame including an upper handle portion and two parallel side portions; a pair of wheels; and means for rotatably securing said pair of wheels in opposed alignment on opposite sides of said frame,, wherein the improvement comprising:
a support plate having a substantially planar shelf portion having a pair of opposed side edges, said support plate being pivotably attached to said frame so that said support plate may pivot about a substantially horizontal axis between a lower horizontally disposed operative position and an upper vertically disposed storage position; and
a pair of side brace members, each brace member having a lower portion adapted to releasably engage said support plate proximate a respective side edge of said support plate, and an upper portion adapted to pivotably and slidably engage a respective side portion of said frame so that each brace member may pivot inwardly about a substantially vertical axis between an operative position substantially perpendicular to said frame and a storage position substantially parallel to said frame and may slide along the respective side portion so as to elevate the brace member when placed in said storage position so that said storage position of each of said brace members is located between said frame and said support plate when said support plate is located in said upper vertically disposed storage position.

7. The apparatus of claim 6, wherein
said support plate further includes a pair of holes, each of said holes being disposed proximate respective forward corners of said shelf portion as formed by the forward edge and respective side edges thereof; and
said lower portion of each of said side brace members including an upwardly projecting pin adapted to engage a respective one of said holes in said support plate when disposed in said lower horizontally disposed operative position.

8. The apparatus of claim 6, wherein
said apparatus includes an axle disposed on a substantially horizontal axis for supporting said pair of wheels in opposed axial alignment on opposite sides of said frame; and
said support plate is adapted to pivotably engage a central portion of said axle.

9. The apparatus of claim 6, wherein
said support plate further includes a flange portion extending upwardly from said shelf portion so that when said support plate is placed in said lower horizontally disposed operative position said flange portion depends substantially downwardly from said frame.

10. The apparatus of claim 6, wherein
said upper portion of each of said side brace members includes a tubular slide section adapted to receive a respective parallel side portion of said frame therewithin.

11. The apparatus of claim 10, wherein
said frame further includes a cross brace member having opposed ends attached to respective parallel side portions of said frame, said cross brace member being positioned so as to form a stop bar on each of said parallel side portions which limits downward movement of each tubular slide section allowing each of said side brace members to reinforce said support plate.

12. A collapsible hand truck, comprising:
a substantially rectangular tubular frame having an upper handle portion, two parallel side portions, a cross brace member, and a lower portion, said frame brace member having opposed ends attached to respective parallel side portions;
an axle attached to said lower portion of said frame extending substantially horizontally to opposite sides of said frame;
a pair of wheels rotatably secured to said axle on opposite sides of said frame;
a support plate having a substantially planar shelf portion, a flange portion extending upwardly from said shelf portion, said shelf portion defining a forward edge and a pair of opposed side edges and having a pair of holes disposed therein, each of said holes in said support plate being disposed proximate respective forward corners of said shelf portion as formed by said forward edge and opposed side edges, said support plate pivotably attaching to said lower portion of said frame so that said support plate may pivot about a substantially horizontal axis between a lower horizontally disposed operative position wherein said flange portion depends substantially downwardly from said frame and an upper vertically disposed storage position; and
a pair of side brace members, each of said side brace members including a lower portion having an upwardly projecting pin adapted to engage a respective one of said holes in said support plate when said support plate is disposed in said lower horizontally disposed operative position so as to releasably engage said support plate proximate a respective opposed side edge of said support plate and an upper portion having a tubular section adapted to receive a respective one of said parallel side portions of said tubular frame therewithin so that each of said side brace members may slide along said respective side portion and pivot about said side portion between an operative position substantially perpendicular to said frame and a storage position substantially parallel to said frame, said storage position placing each of said side brace members between said frame and said support plate when said support plate is located in said upper vertically disposed storage position.

13. The apparatus of claim 12, wherein said support plate pivotably engages a central portion of said axle.

14. The apparatus of claim 1, wherein:
said hand truck includes a pair of side brace members; and
a corresponding pair of holes are disposed in said support plate.

15. A hand truck including an upright frame and a support plate mounted proximate the lower end of the frame for movement between an operative position extending generally forwardly from the frame and a folded, storage position pivoted upwardly with respect to the frame, characterized in that the support plate is supported in its operative position by at least one side brace member mounted on the frame for pivotable movement about a generally vertical axis between an operative position in which it extends forwardly from the frame and releasably engages and supports the support plate in the operative position of the support plate and a folded, storage position in which it is disengaged from the support plate and pivoted to a position in which it is generally parallel to the frame, said at least one side brace member being mounted for sliding movement on said frame in a direction generally parallel to said vertical axis.

16. The apparatus of claim 15 wherein
said support plate includes a generally planar shelf portion and the pivot axis of the support plate is spaced from the plane of said shelf portion so that said at least one side brace member may be slid upwardly on said frame, and said support plate may be pivoted upwardly to provide a storage condition in which said at least one side brace member is located between said support plate and said frame.

17. The apparatus of claim 15, wherein
said frame includes a vertical rail; and
said at least one side brace member includes a tubular section slidably mounted on said rail.

* * * * *

UNITED STATES PATENT AND TRADEMARK OFFICE
CERTIFICATE OF CORRECTION

PATENT NO. : 5,118,130
DATED : June 2, 1992
INVENTOR(S) : Kaltz

It is certified that error appears in the above-indentified patent and that said Letters Patent is hereby corrected as shown below:

Column 1, line 67, delete "boy do" and insert --body of --

Column 3, line 58, delete "portion" and insert --position --.

Signed and Sealed this

Twenty-fourth Day of August, 1993

Attest:

BRUCE LEHMAN

Attesting Officer     Commissioner of Patents and Trademarks